Dec. 2, 1924.

H. PARKER ET AL 1,517,747

FELT GUIDE

Filed May 8, 1920 3 Sheets-Sheet 1

Inventor
Howard Parker
Charles W Sluper

By

Their Attorney

Dec. 2, 1924.  1,517,747
H. PARKER ET AL
FELT GUIDE
Filed May 8, 1920   3 Sheets-Sheet 2
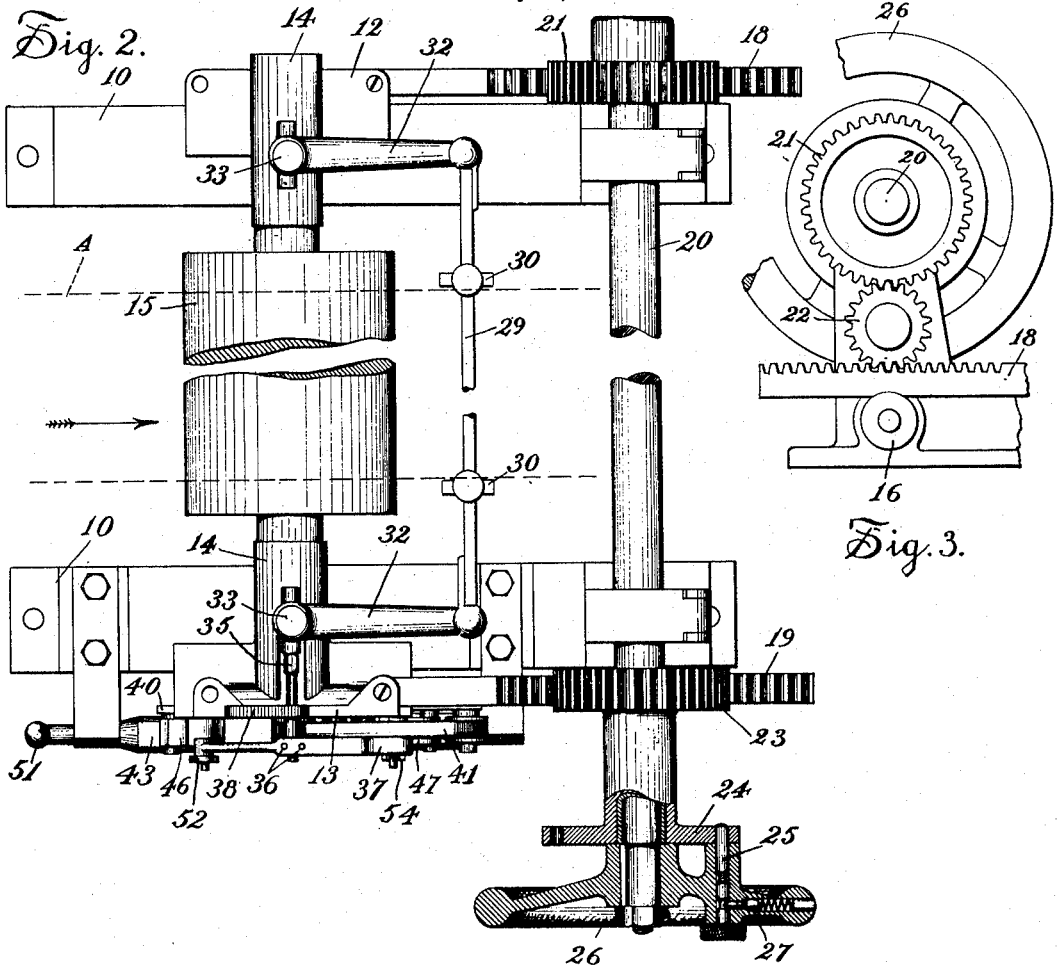
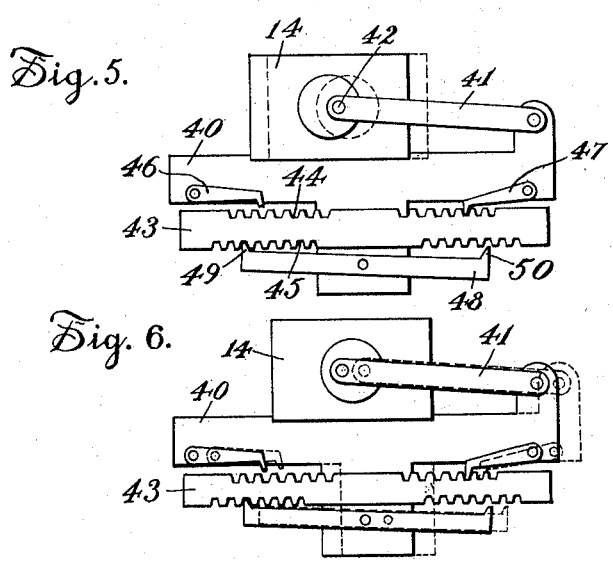
Inventor
Howard Parker
Charles W. Hupe
By
Their Attorney Dec. 2, 1924.

H. PARKER ET AL 1,517,747

FELT GUIDE

Filed May 8, 1920

Inventor
Howard Parker
Charles W. Sleeper

By

Their Attorney

Patented Dec. 2, 1924.

1,517,747

UNITED STATES PATENT OFFICE.

HOWARD PARKER, OF BERLIN, AND CHARLES W. SLEEPER, OF LANCASTER, NEW HAMPSHIRE, ASSIGNORS TO BROWN COMPANY, OF BERLIN, NEW HAMPSHIRE, A CORPORATION OF MAINE.

FELT GUIDE.

Application filed May 8, 1920. Serial No. 379,694.

*To all whom it may concern:*

Be it known that we, HOWARD PARKER and CHARLES W. SLEEPER, citizens of the United States, and residents of Berlin and Lancaster, respectively, county of Coos, State of New Hampshire, have invented certain new and useful Improvements in a Felt Guide, of which the following is a specification.

The object of the present invention is to provide a guide for felts, belts or the like having features of novelty and advantage and particularly to provide a device of this sort of maximum efficiency in that it will immediately correct any tendency on the part of the felt to shift out of normal position.

The device of the present invention is applicable for use wherever devices of this character are generally employed, but it has particular adaptability to paper making machines where very long endless felts are used.

In the accompanying drawings is shown the preferred embodiment of the present invention, but it is to be understood that this disclosure is by way of illustration only and it is not to be taken as restrictive of our conception.

In these drawings:—

Fig. 2 is a plan view.

Fig. 3 is an elevational view of the gearing on the left hand side of the device.

Figs. 5 and 6 are views diagrammatically illustrating the operation of certain parts.

Figure 1:
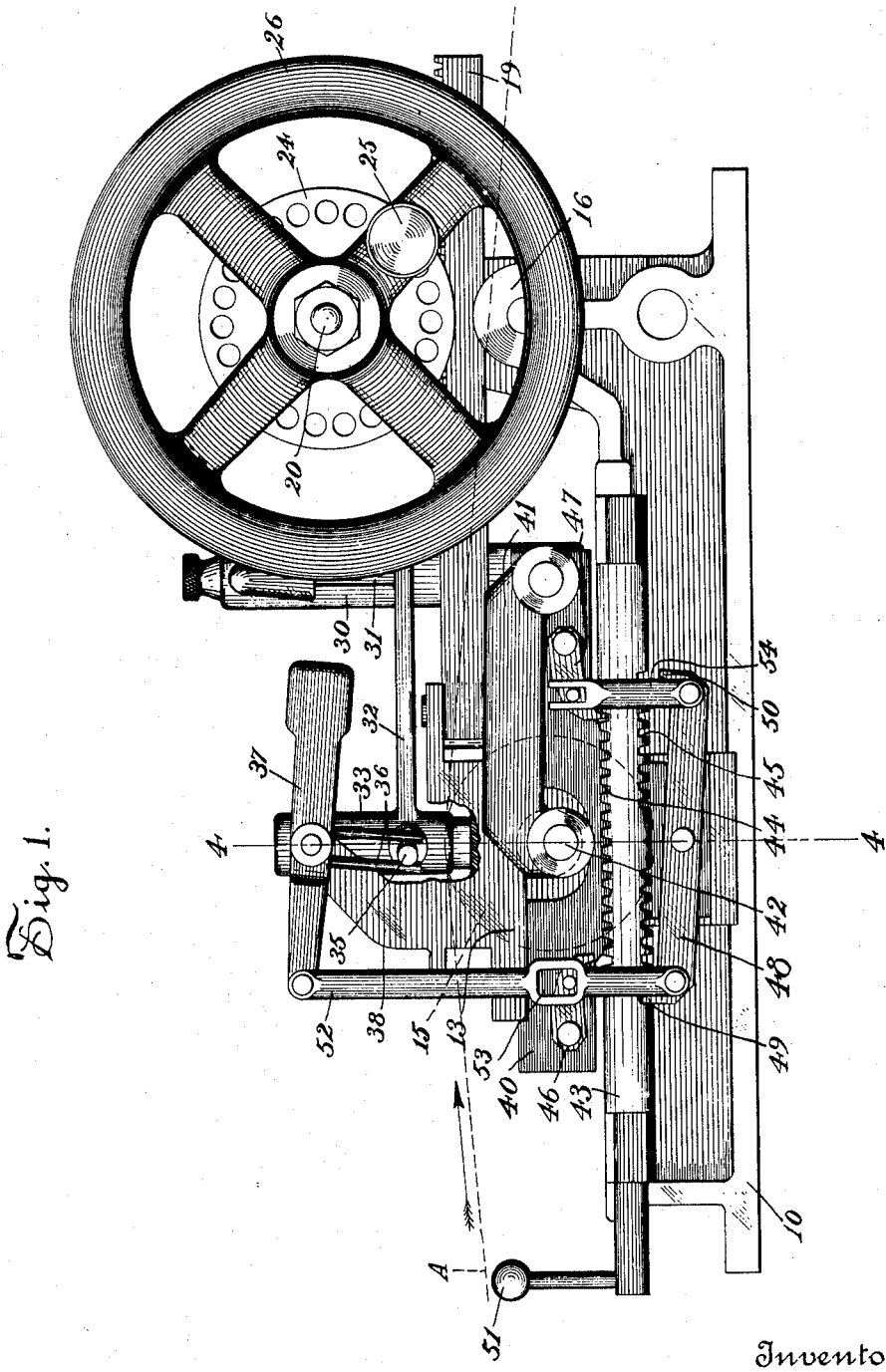
Fig. 1 is an elevational view of one side of the device, this side of the device in the following description being referred to for convenience as the right hand side.
Figure 4:
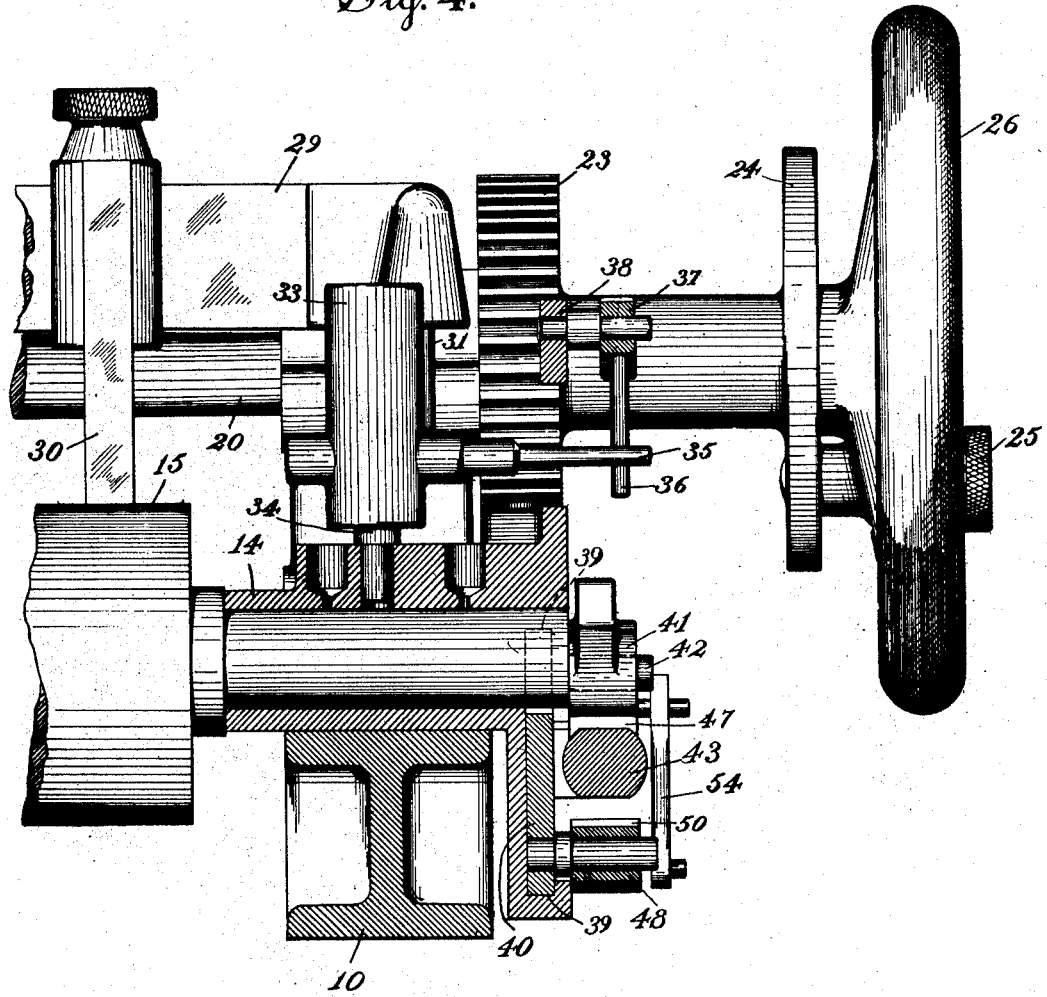
Fig. 4 is a vertical section taken on line 4—4 of Fig. 1.

Referring to the drawings in detail, 10, 10 denote bases which may be secured to or form a part of the frame of the machine to which the present device is applied. On these bases are slidably mounted bearing boxes 12 and 13 having bearings 14 in which are journaled the gudgeons of a roller 15 over which the felt A travels in the direction of the arrow, Fig. 2.

Connected to the bearing boxes 12, 13 respectively and supported by rollers 16 are racks 18 and 19. Mounted in suitable bearings on the bases 10 is a shaft 20 on the left hand end of which is fixed a gear 21 meshing with an intermediate gear 22 which meshes with the rack 18 (see Fig. 3). On the right hand end of the shaft 20 is a loose gear 23 meshing directly with the rack 19. Integral with a hub of the gear 23 is a disk 24 having a plurality of apertures in any one of which is adapted to engage a bolt 25 carried by one of the spokes of a hand wheel 26 keyed to the shaft 20. The bolt 25 is maintained in engaging and disengaging positions by a spring pressed plunger 27.

It will be seen that with the structure thus far described, when the bolt 25 is in engaging position with the disc 24, as shown in Fig. 2, the gear 23 is fixed to the shaft 20 and upon rotation of the hand wheel 26, the bearing boxes 12 and 13 will be moved in opposite directions and the roll 15 is thus angularly displaced. When the bolt 25 is disengaged from the disc 24, the bearing box 12 only is moved on rotation of the shaft 20.

Extending transversely of the felt A is a spreader or rod 29 adjustably carrying a pair of depending fingers 30, one adjacent each edge of the belt. The opposite ends of the spreader 29 are pivotally supported by pins 31 extending upwardly from the free ends of arms 32 extending from sleeves 33 fitting about posts 34 arising from the bearings 14. Extending outwardly from the right hand sleeve 33 is a finger 35 positioned between pins 36 depending from a weighted lever 37 pivoted to an arm 38 of the bearing box 13.

The bearing box 13 has in its outer face a pair of opposed grooves 39 forming a way in which is mounted a slide 40 connected by means of a pitman 41 to an eccentric 42 extending from the gudgeon of the roller 15. Carried by the base 10 and adjacent to the slide 40 is a rack bar 43 having upper and lower racks 44 and 45 respectively. Pivoted on the slide 40 is a pair of oppositely-acting pawls 46 and 47 adapted to cooperate with rack 44. Also pivoted to the slide 40 is a double-ended pawl 48 the teeth 49 and 50 of which cooperate with the rack 45. The pawl 47 and the tooth 49 are so constructed and arranged that when they are in engagement with the racks on the bar 43, the slide 40 is locked against movement towards the rear of the machine, that is, towards the left referring to Fig. 1 but it may move in the opposite direction; the pawl 46 and the tooth 50 when in engagement with the racks prevent the slide from moving to the right but permit it to be moved to the left, referring to Fig. 1. The rack bar 43 is supported so that it may be turned by a handle 51 to present the smooth surfaces between the racks 44 and 45 to the pawls when it is desired to throw the felt guide out of operation.

Between one end of the weighted lever 37 and one end of the pawl 48 is a link 52 having an opening 53 on the lower edge of which rests a pin extending out from the pawl 46. Connected to the opposite end of the pawl 48 is a link 54 the upper end of which is bifurcated so as to receive and support a pin extending from the pawl 47.

The operation of the device is briefly as follows:

The roll 15 is brought into such position relative to the felt that the felt will normally run in line, this being accomplished by turning the hand wheel 26 to move the bearings 12 and 13 in opposite directions when the bolt 25 is in engaging position as shown in Fig. 2, or to move the bearing 12 only when the bolt is disengaged from the disc 24. When the felt is in normal position, the pawls 46, 47 and 48 are out of engagement with the racks 44 and 45 so that the slide 40 is free to be reciprocated by the eccentric 42 acting through the pitman 41.

In the event the felt shifts to the right hand side of the device, for any reason, the felt will engage the right hand finger 30 thereby shifting the spreader which, acting through the arm 32, finger 35 and lever 37, raises the link 52 and this brings the pawls 49 and 47 into engagement with the teeth of the rack 45 and 46 respectively, as shown in Fig. 1 and in full lines Figs. 5 and 6. Owing to the weight on the lever 27, the connections between the spreader and the pawls 47, 48 and 49 are nicely balanced and therefore but a slight pressure of the felt on either of the fingers 30 is necessary to set the parts in operation. The slide 40 is now locked against movement towards the left, referring to Fig. 1, and therefore the pitman and the eccentric 42 are held against movement in this direction. This means that during that half of the revolution of the roll 15 in which the eccentric, if not fixed, would move rearwardly, that is to the left of Fig. 1, the right hand end of the roller (and of course the bearing box 13 supporting the same) must move to the right of Fig. 1, and into the position shown in dotted lines Fig. 5 and full lines Fig. 6. During the next half revolution of the roll, the eccentric 42, acting through the pitman, will move the slide forwardly, that is from the full line position to the dotted line position Fig. 6, this being permissible as the pawls 47 and 49 will ride over the rack teeth 44 and 45 respectively. On the next half revolution of the roll, the right hand end thereof will again be moved forwardly and then the slide is moved forwardly and thus the bearing box 13 and the slide 40 will alternately be moved forwardly step by step until the angular displacement of the roll is such as to cause the felt to shift back into normal position.

It is evident that when the felt shifts out of normal towards the left hand side of the machine, the pawls 46 and 50 are brought into engagement with the racks 44 and 45 respectively and the bearing box 13 and slide 40 will alternately be moved step by step towards the left of Fig. 1.

It will, of course, be understood that if the bolt 25 is out of engagement with the disc 24, the gear 23, upon movement of the bearing box 13, will be rotated without rotating the shaft 20 and, therefore, the position of the left hand side bearing box 12 will not be affected. If the plunger 25 is in engagement with the disc 24, movement of the bearing box 13 in either direction will be so communicated to the bearing box 12 that it will be moved in the opposite direction.

It is, of course, obvious that the invention is susceptible of various modifications and changes which are within the spirit of the invention wthout departing from the scope of the following claims, it being understood that the present disclosure of the invention is by way of illustration only and it is not to be taken as restrictive of our conception.

We claim as our invention:—

1. In a device of the character described, a roll, a slidable bearing box supporting one end of said roll, a felt passing over said roll, a slide mounted for movement on said bearing box, a pitman between said slide and roll, a rack adjacent said slide, a pawl pivoted on said slide adapted to cooperate with said rack to prevent movement of the slide in one direction while permitting movement thereof in the opposite direction, a member adapted to be shifted by and transversely of said felt when the latter runs out of normal, and a connection between said member and said pawl whereby when the felt shifts out of normal said pawl is brought into engagement with said rack.

2. In a device of the character described, a roll, a slidable bearing box supporting one end of said roll, a felt passing over said roll, a slide carried by said bearing box, a pitman between said slide and roll, a rack adjacent said slide, a pawl on said slide adapted to cooperate with said rack to prevent movement of the slide in one direction while permitting movement thereof in the opposite direction, and means actuated by said felt when it runs out of normal for controlling the engagement of said pawl with said rack.

3. In a device of the character described, a roll mounted for angular movement, a felt passing thereover, a pawl operatively connected to and reciprocated by said roll, a rotatable rack into and out of operative relation to said pawl, and means controlled by said felt when it runs out of normal for throwing said pawl into engagement with said rack.

4. In a device of the character described, a roll mounted for angular displacement, a felt passing thereover a member eccentrically connected to and reciprocated by said roll, a rack member having a rack surface and a smooth surface and mounted for rotary movement whereby either of said surfaces may be brought into operative relation to a pawl, said pawl carried by said reciprocating member and normally out of engagement with said rack, and means actuated by said felt for controlling the engagement of said pawl with said rack.

5. A felt guide comprising, in combination, a roll over which the felt is arranged to pass, movable bearing boxes for the opposite ends of the roll, means manually operable for moving said boxes simultaneously in opposite directions to obtain an initial normal position for said roll, means for disconnecting one of said boxes from said manually operable means, and means automatically operable thereafter to adjust the relative positions of said boxes.

6. In a device of the character described, a roll mounted for angular displacement to both sides of a normal position, a felt passing thereover, a slide eccentrically connected to said roll whereby said slide is normally constantly reciprocated, a rack member having two rack surfaces, normally inoperative oppositely acting pawls carried by said slide and adapted to cooperate with one of said rack surfaces, a lever pivoted to said slide and having a pawl tooth at each end adapted to cooperate with the other rack surface, means controlled by said felt when it runs out of normal, and connections between said lever and pawls and said felt controlled means substantially as described.

7. In a device of the character described, a roll having each end mounted for bodily displacement, a felt passing over said roll, normally inoperative means associated with one end of said roll and adapted to cause said roll owing to its rotation to displace itself, means controlled by said felt when it runs out of normal for rendering said first mentioned means operative, and a connection between the opposite ends of said roll whereby said ends are displaced in opposite directions.

8. In a device of the character described, a roll, a felt passing thereover, movable bearing boxes supporting opposite ends of said roll, means controlled by said felt for moving said bearing boxes, a connection between said bearing boxes whereby when one is moved in one direction the other is moved in the opposite direction, and means for disconnecting said boxes.

9. In a device of the character described, a roll having each end mounted for bodily displacement, a felt passing over said roll, means associated with one end of said roll and adapted to cause said roll owing to its rotation to displace itself, means actuated by said felt when it runs out of normal for controlling said first mentioned means, a connection between the opposite ends of said roll whereby said ends are displaced in opposite directions, and means for disengaging said connection.

10. In a device of the character described, a roll, a felt passing thereover, movable bearing boxes supporting the opposite ends of said roll, automatically operated means controlled by said felt for moving one of said bearing boxes, and a connection between said bearing boxes whereby when said automatically operated means moves the bearing box with which it is associated in one direction the other bearing box is moved in the opposite direction.

11. In a device of the character described, a roll, a felt passing thereover, movable bearing boxes supporting the opposite ends of said roll, automatically operated means controlled by said felt for moving one of said bearing boxes, and a connection between said bearing boxes whereby when said automatically operated means moves the bearing box with which it is associated in one direction the other bearing box is moved in the opposite direction, said connection including a shaft and driving means between said shaft and each of said bearing boxes.

12. In a device of the character described, a roll, a felt passing thereover, movable bearing boxes supporting the opposite ends of said roll, automatically operated means controlled by said felt for moving one of said bearing boxes; a connection between said bearing boxes whereby when said automatically operated means moves the bearing box with which it is associated in one direction the other bearing box is moved in the opposite direction, said connection including a shaft and driving means between said shaft and each of said bearing boxes; and means for disconnecting and connecting at will one of said driving means to said shaft.

13. In a device of the character described, a roll, a felt passing thereover, movable bearing boxes supporting the opposite ends of said roll, automatically operated means controlled by said felt for moving one of said bearing boxes, a connection between said bearing boxes whereby when said automatically operated means moves the bearing box with which it is associated in one direction the other bearing box is moved in the opposite direction, said connection including a shaft; and means on said shaft for manually rotating the same.

14. In a device of the character described, a roll, a felt passing thereover, movable bearing boxes supporting opposite ends of said roll, means controlled by said felt for moving one of said bearing boxes; a connection between said bearing boxes whereby when one is moved in one direction the other is moved in the opposite direction, said connection including a rack connected to each bearing box, a shaft, a gear fixed thereon and adapted to drive one of said racks, a gear loose on said shaft and adapted to drive the other of said racks and means for detachably connecting said loose gear to said shaft; and means for manually rotating said shaft.

15. A felt guide comprising, in combination, a roll over which the felt is arranged to pass, movable bearing boxes for the opposite ends of the roll, means manually operable for moving said boxes simultaneously in opposite directions to obtain an initial normal position for said roll, means for disconnecting one of said boxes from said manually operable means, and means automatically operable thereafter to move said disconnected box whereby the felt is guided to alined position on the roll.

HOWARD PARKER.
CHARLES W. SLEEPER.

Witnesses:
GEO. N. KENT,
BLANCHE BERNIER.